Dec. 6, 1927.

H. SYNCK 1,651,851

TRANSPLANTER

Filed April 9, 1920

Inventor:
Henry Synck
By Fred Gerlach
Atty.

Patented Dec. 6, 1927.

1,651,851

UNITED STATES PATENT OFFICE.

HENRY SYNCK, OF COLDWATER, OHIO, ASSIGNOR, BY MESNE ASSIGNMENTS, TO THE NEW IDEA SPREADER COMPANY, OF COLDWATER, OHIO, A CORPORATION OF OHIO.

TRANSPLANTER.

Application filed April 9, 1920. Serial No. 372,386.

The invention relates to transplanters.

One object of the invention is to provide an improved transplanter in which the furrow-opener is locked to the wheeled carrying frame so that it will cut a furrow of uniform depth regardless of the density of the soil. Another object of the invention is to provide an improved transplanter in which the pressing devices at both sides of the plants are operated uniformly instead of separately. A still further object of the invention is to provide a transplanter of improved construction and operation.

The invention consists in the several novel features hereinafter set forth and more particularly defined by the claims at the conclusion hereof.

Figure 1:
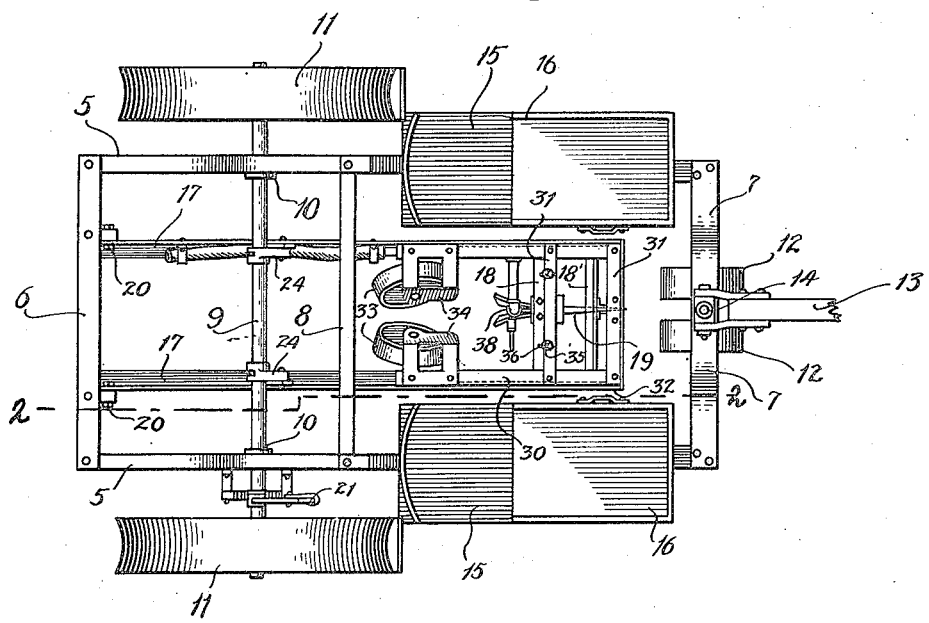
Figure 2:
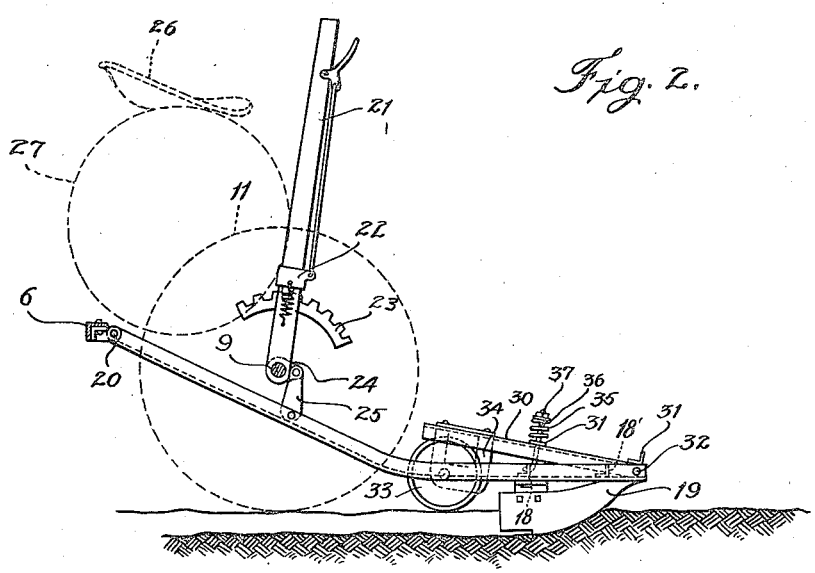

In the drawing: Fig. 1 is a plan of a transplanter embodying the invention, parts being omitted. Fig. 2 is a longitudinal section taken on line 2—2 of Fig. 1.

The carrying frame comprises sills 5 which are cross-connected by a rear bar 6, a front arch 7 and an intermediate bar 8, all secured together to form a rigid structure. An axle 9 is mounted in the bearings 10 fixed to the main frame and rear carrying-wheels 11 are mounted to rotate on the axle. Front wheels 12 are dirigibly mounted under the arch 7 and the draft-tongue 13 is connected to the standard 14 which is carried by said wheels.

Seats 15 for the plant-setters are supported on the sills 5 of the wheeled frame and plant boxes 16 are also suitably supported from said frame.

A furrow-opener 19 is fixed to the front end of a frame which comprises side-bars 17 and cross-bars 18, 18' secured together to form a rigid structure. This frame serves as a support for the furrow-opener and its rear end is pivoted, as at 20, to the carrying-frame so that its front end which carries the furrow opener may be raised or lowered to vary the depth of the cut or to lift it out of the soil. The furrow-opener is adapted to be locked in positions to operate at different depths, by a lever 21 which is fixed to the axle 9 and carries a suitable locking device 22 which engages with a rack 23 which is fixed to the carrying frame. Arms 24 are fixed to the axle and connected by links 25 to the side-bars 17 of the furrow opener frame. Lever 21 is operable by the driver of the machine. The latter is usually provided with a seat 26 and a water-tank 27 from which water is supplied to the plants, as well understood in the art. This lever and lock exemplify means for adjustably and rigidly locking the furrow-opener and its support to the wheeled carrying frame.

A planting-frame comprising side-bars 30 and cross-bars 31 secured together to form a rigid structure, has its front end pivoted, as at 32, to the front end of the side bars 17. Planting devices for pressing the soil around the plants are exemplified by wheels 33 which are mounted in brackets 34 secured to the side-bars 30 respectively, of the planting-frame. Springs 35 are applied to press the wheels 33 against the soil. Bolts 36 carried by the furrow-opener frame extend through holes in the rear cross-bar 31 and are provided with adjustable nuts 37 which serve as abutments for the springs 35 which are interposed between said nuts and the side-bars 30.

In operation, the driver will set and lock the support for the furrow opener 19 so the opener will cut a furrow of the desired depth, and being rigidly locked to the carrying frame, the furrow will be of uniform depth despite variations in the density of the soil. The plant setters on the seats 15 will deposit plants into the furrow immediately behind the furrow-opener 19. It will be understood that a pipe 38 and suitable controlling devices, as well understood in the art, will be provided for delivering water from the reservoir 27 to the furrow and plants. After the plants have been set, the wheels 33 will uniformly press the soil around the plants at both sides thereof and close the furrow. By providing a frame which causes the planting devices to rise and fall together, instead of individually, the soil at both ends of the plants will be evenly pressed and the plants will grow aligned and erect.

By adjusting the lever 21, the depth of the cut or furrow may be varied. A characteristic of the structure described is that the furrow will be of uniform depth and the weight of the operators or spring-pressure is not depended upon to determine the penetration of the opener in the soil or the depth of the furrow.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a transplanter, the combination of a carrying frame, front and rear ground wheels for carrying the frame a predetermined distance above the ground, a furrow-opener disposed rearwardly of the front wheels and forwardly of the rear wheels, a frame pivoted to the carrying-frame and to which the furrow-opener is rigidly secured, means for adjustably locking the furrow-opener frame to the carrying-frame so that the furrow-opener will make a furrow of uniform depth, devices behind and spaced from the furrow-opener for pressing soil around the roots of the plants deposited in the furrow, a frame pivoted to said furrow-opener frame and to which said presser-devices are secured, a spring connection between the furrow-opener frame and the presser-device frame which permits the latter to move relatively to said furrow-opener frame, and a platform disposed rearwardly of the front wheels and forwardly of the rear wheels and mounted on the carrying frame and adjacent the ground and the space between the furrow-opener and the presser devices for carrying an operator in a position so he may deposit plants directly into the furrow, said furrow-opener and presser-device frames being formed to leave spaces through which the plants may be deposited by the operator into the furrow between the furrow-opener and the presser-devices.

2. In a transplanter, the combination of a carrying frame, ground wheels for said frame, an axle for said wheels, a furrow-opener, a frame pivoted at its rear end to the carrying-frame and unattached to the frame at its front end, and to which the furrow-opener is fixedly secured, means for adjustably locking the furrow-opener frame to the carrying-frame, devices behind the furrow-opener for pressing the soil around the plants, a platform adjacent the ground and the space between the furrow-opener and the presser devices for carrying an operator in position so he may deposit plants directly into the furrow, a frame to which said devices are secured, pivoted to the front end of the furrow-opener frame, said furrow-opener and presser device frames being formed with spaces therein through which the plants may be placed into the furrow between the furrow-opener and the presser device, and a yielding connection between the furrow-opener frame and the presser device frame.

3. In a transplanter, the combination of a carrying frame, front and rear ground wheels for carrying the frame a predetermined distance above the ground, a furrow-opener disposed rearwardly of the front wheels and forwardly of the rear wheels, a frame pivoted at one end to the carrying-frame and to which the furrow-opener is rigidly secured, said frame comprising bars at the sides of the furrow-opener and a cross-bar, means for adjustably locking the furrow-opener frame to the carrying-frame so that the furrow-opener will make a furrow of uniform depth, devices behind and spaced from the furrow-opener for pressing soil around the roots of the plants deposited in the furrow, a frame pivoted to the other end of said furrow-opener frame and to which said presser-devices are secured, said last mentioned frame comprising side bars and a cross-bar, a spring connection between the furrow-opener frame and the presser-device frame which permits the latter to move relatively to said furrow-opener frame, and a platform disposed rearwardly of the front wheel and forwardly of the rear wheels and mounted on the carrying frame and adjacent the ground and the space between the furrow-opener and the presser devices, for carrying an operator in a position so he may deposit plants directly into the furrow, the side-bars and cross-bars of the furrow-opener and presser-device frames being disposed to form spaces through which the plants may be deposited by the operator into the furrow between the furrow-opener and the presser-devices.

HENRY SYNCK.